United States Patent [19]

Wenzel et al.

[11] 4,331,717

[45] May 25, 1982

[54] AQUEOUS DISPERSIONS OR SOLUTIONS OF OLIGOMERIC OR POLYMERIC PLASTICS, A PROCESS FOR THEIR PRODUCTION AND THEIR USE

[75] Inventors: Wolfgang Wenzel, Bergisch Gladbach; Walter Meckel, Neuss, both of Fed. Rep. of Germany

[73] Assignee: Bayer Aktiengesellschaft, Leverkusen, Fed. Rep. of Germany

[21] Appl. No.: 48,557

[22] Filed: Jun. 14, 1979

[30] Foreign Application Priority Data

Jun. 21, 1978 [DE] Fed. Rep. of Germany ....... 2827156

[51] Int. Cl.³ ......................... B05D 3/02; C08L 71/04

[52] U.S. Cl. .............................. 427/389.7; 156/307.3; 156/327; 156/330; 427/386; 427/389; 427/389.8; 427/389.9; 427/393; 427/393.5; 524/589; 524/591; 524/839; 524/845; 524/816

[58] Field of Search ................ 260/29.2 TN, 29.2 EP, 260/29.2 E, 29.2 N, 29.6 HN, 29.6 CM, 29.6 PM, 29.2 R; 528/46; 427/389.7, 389.8; 156/307.3

[56] References Cited

U.S. PATENT DOCUMENTS

| | | | |
|---|---|---|---|
| 3,388,087 | 6/1968 | Dieterich et al. | 260/29.2 TN |
| 3,480,592 | 11/1969 | Dieterich et al. | 260/77.5 |
| 3,491,050 | 1/1970 | Keberle et al. | 260/29.2 TN |
| 3,756,992 | 9/1973 | Dieterich et al. | 260/29.2 TN |
| 3,804,786 | 4/1974 | Sekmakas | 260/29.2 TN |
| 4,094,842 | 6/1978 | Wenzel et al. | 260/29.2 TN |

FOREIGN PATENT DOCUMENTS

| | | |
|---|---|---|
| 2347420 | 11/1977 | France . |
| 1523739 | 12/1975 | United Kingdom . |
| 1501769 | 2/1978 | United Kingdom . |
| 1538970 | 1/1979 | United Kingdom . |

*Primary Examiner*—Theodore E. Pertilla
*Attorney, Agent, or Firm*—Gene Harsh; Lawrence S. Pope; Thomas W. Roy

[57] ABSTRACT

The present invention relates to aqueous dispersions or solutions of oligomers or polymers, polycondensates or polyaddition products containing from about 2 to 200 milliequivalents per 100 g of solids, of incorporated ammonium groups obtained by neutralizing incorporated tertiary nitrogen atoms with organic acids, characterized in that the organic acids on which the ammonium groups are based are acids which lose their acid character at temperatures in the range from about 20° to 200° C. in the absence of water without releasing corrosive decomposition products. The present invention further relates to a process for the production of these novel aqueous dispersions or solutions and to their use.

9 Claims, No Drawings

AQUEOUS DISPERSIONS OR SOLUTIONS OF OLIGOMERIC OR POLYMERIC PLASTICS, A PROCESS FOR THEIR PRODUCTION AND THEIR USE

FIELD OF THE INVENTION

This invention relates to new aqueous dispersions or solutions of plastics which can be converted by simple heat treatment into water-resistant plastics, to a process for their production and to their use for the production of water-resistant coatings and bonds.

BACKGROUND OF THE INVENTION

The production of stable, aqueous dispersions or solutions of plastics is known from the prior art.

Thus, the production of aqueous dispersions or solutions of polyurethanes which may contain urea groups is described, for example, in German Pat. Nos. 1,178,586 and 1,184,946; German Offenlegungsschrifts Nos. 1,495,745, 1,770,068, 2,314,512, 2,446,440, 2,543,091 and 2,642,073; U.S. Pat. Nos. 3,480,592, 3,388,087, 3,479,310, 3,756,992 and 3,905,929 and in "Angewandte Chemie", 82, 53 et seq. (1970).

The production of aqueous or water-dilutable polycondensates, particularly polyester resins, which may contain organic solvents and urethane groups is also known from the prior art (cf. for example German Offenlegungsschrift No. 2,225,646, German Auslegeschrift No. 2,239,094, German Offenlegungsschrift No. 2,446,439, U.S. Pat. Nos. 3,876,582 and 4,029,617 and also Houben-Weyl "Methoden der Organischen Chemie", XIV/2 (1963), pages 30 et seq).

The production of polymers, particularly polyacrylates, containing incorporated ionic groups is also known from the prior art (cf. for example Houben-Weyl "Methoden der Organischen Chemie", Vol XIV/1 (1961), pages 1033 et seq or XIV/2 (1963), page 754).

All processes for producing dispersions or solutions of the type in question are based on the principle of incorporating hydrophilic centers into a macromolecular chain of a polymer. In the known dispersions, these hydrophilic centers, or so-called internal emulsifiers, are ionic groups or ether functions. These centers are generally introduced either in the form of special diols or in the form of modified amines during synthesis of the polymer.

In the case of cationic aqueous systems, a basic nitrogen atom is generally incorporated in the polymer chain, being converted into the salt form by quaternization or by neutralization with an organic or inorganic acid.

Unfortunately, known cationic dispersions are frequently attended by serious disadvantages. On the one hand, the ionic groups remaining in the polymer can seriously affect its wet strength. On the other hand, the inorganic or organic acids which are liberated during stoving or their corrosive decomposition products frequently destroy the coating or dipping units used for applying the dispersions by corrosion. Hydrochloric acid and acetic acid are particularly troublesome in this respect.

An interesting solution to this problem is proposed in German Offenlegungsschrift No. 2,460,470 (corresponding to British Pat. No. 1,523,739), according to which the basic nitrogen atom is converted into the salt form in aqueous phase using carbon dioxide and is used in this form as emulsifier for the polymer.

However, this process is attended by two serious disadvantages.

1. It is necessary to use powders or organic solvents for homogeneously dissolving the polymer, and 2. the dispersions formed show only very limited stability in storage because of the weak acidity of the acid used. Dispersions produced by this process sediment after a few days.

An object of the present invention is to provide storable dispersions or solutions of cationic polymers which lead to ion-free, hydrophobic, i.e. water-resistant, coatings and bonds.

The present invention provides for the first time storable aqueous dispersions or solutions of ionic plastics which, on heating, i.e. during and/or after application of the dispersion or solution, lose thier ionic character without corrosive acids or other decomposition products being released at the same time. The new principle according to the invention consists in converting oligomeric or polymeric plastics containing tertiary nitrogen atoms into the water-soluble or water-dispersible salt form with acids, which, on heating, lose their acid function without releasing corrosive decomposition products or in using low molecular weight synthesis components containing ammonium groups obtained by reacting tertiary amine functions with acids of this type for the synthesis of the plastics.

SUMMARY OF THE INVENTION

Accordingly, the present invention relates to aqueous dispersions or solutions of oligomers or polymers, polycondensates or polyaddition products containing from about 2 to 200 milliequivalents per 100 g of solids, of incorporated ammonium groups obtained by neutralizing incorporated tertiary nitrogen atoms with organic acids, characterized in that the organic acid on which the ammonium groups are based is an acid which loses its acid character at temperatures in the range from about 20 to 200° C. in the absence of water without releasing corrosive decomposition products.

The present invention also relates to a process for the production of these aqueous dispersions or solutions by synthesizing oligomeric or polymeric plastics in known manner by the polymerization, polycondensation or polyaddition of low molecular weight synthesis components using synthesis components containing tertiary amine nitrogen and/or ammonium groups obtained by the neutralization of incorporated tertiary amino groups with organic acids, at least partly neutralizing the tertiary amino groups present, if any, with an organic acid, the type and quantity of the synthesis components containing tertiary amino groups and/or ammonium groups and their degree of neutralization being selected in such a way that the corresponding oligomers or polymers contain from about 2 to 200 milliequivalents of ammonium groups per 100 g of solids, and converting the oligomers or polymers in known manner into an aqueous dispersion or solution during or after the synthesis reaction giving the oligomer or polymer, characterized in that organic acids which lose their acid character at temperatures in the range from about 20° to 200° C. in the absence of water without releasing corrosive decomposition products are used for neutralizing the tertiary amino groups and/or for producing the synthesis components containing ammonium groups.

Finally, the present invention also relates to the use of these aqueous solutions or dispersions for producing water-resistant coatings or bonds on substrates of any kind, characterized in that, after shaping, the dispersions or solutions are stored or heat-treated at temperatures in the range from about 20° to 200° C. during and/or after removal of the water by evaporation.

DETAILED DESCRIPTION OF THE INVENTION

The new principle behind the invention of using acids which lose their acid function on heating for converting tertiary amino groups into hydrophilic ammonium groups may be applied to any plastics. This means that both polyaddition products such as, for example, polyurethanes, polyureas or polyalkylene oxides; polycondensation products such as, for example, polyester, polyamides or polycarbonates, or polymerization products such as, for example, polyacrylates may be modified according to the principle according to the invention. The only requirement is that the polymers in question should contain an adequate quantity of basic, particularly tertiary, nitrogen atoms in chemically incorporated from which may subsequently be converted into hydrophilic ammonium groups by neutralization with the acids essential to the invention in order thus to guarantee the dispersibility or the solubility of the polymers in water, and/or that starting materials containing ammonium groups should be used during the actual synthesis of the polymers in a quantity which guarantees their dispersibility or solubility in water, the synthesis components containing ammonium groups being neutralization products of synthesis components containing tertiary amine nitrogen with the acids essential to the invention. Accordingly, the tertiary amine function may be neutralized before or even after production of the polymers. Basically, however, it is also possible for the polymer to be synthesized and the tertiary amine function to be neutralized in situ in a one-pot process, i.e. simultaneously, in such a way that synthesis components containing tertiary amino groups and acids essential to the invention are simultaneously used in the synthesis reaction leading to the polymer.

In general, the plastics present in the aqueous dispersions or solutions according to the invention are polymers of high molecular weight, i.e. polymers having a molecular weight above about 20,000. However, the process according to the invention may also be applied to plastics of comparatively low molecular weight, i.e. to plastics which have a molecular weight in the range from about 1000 to 20,000 and which, for this reason, it is more appropriate to term "oligomers". Accordingly, the term "polymer" is used hereinafter both for genuine polymers, i.e. polymers of high molecular weight, and also for comparatively low molecular weight oligomers of this type.

The process according to the invention is carried out by methods known per se from the prior art. In the case of the preferred aqueous dispersions or solutions of polyurethanes or polyurethane polyureas, this means that the macromolecule is synthesized by reacting organic diisocyanates with synthesis components difunctional in the context of the isocyanate-polyaddition reaction containing isocyanate-reactive hydrogen atoms, optionally together with small quantities of synthesis components monofunctional or higher than difunctional in the context of the isocyanate-polyaddition reaction using methods known per se from the prior art as described, for example, in the literature references cited above in the acknowledgement of the prior art, in particular in U.S. Pat. Nos. 3,756,992 and 3,479,310, incorporated herein by reference, and in German Offenlegungsschrift Nos. 2,623,962 or 2,637,690, the starting materials mentioned by way of example in these literature references being used and synthesis components containing tertiary amine nitrogen preferably being incorporated through tertiary amines containing hydroxyl and/or primary or secondary amino groups during the synthesis of the macromolecules.

The step essential to the invention, i.e. neutralizing these tertiary amino groups with the acids essential to the invention, is preferably carried out after synthesis of the macromolecule before or during formation of the dispersion or solution. Suitable synthesis components containing tertiary amino groups are described, for example, in U.S. Pat. No. 3,479,310, column 4, lines 10 to 62, incorporated herein by reference. In principle, it would also be possible, although less preferable, to use the neutralization products of the amino alcohols containing tertiary amino groups mentioned by way of example with the acids essential to the invention at the very beginning of the synthesis of the polyaddition products.

The group of polyaddition products which may also be converted into aqueous dispersions or solutions according to the invention by the process according to the invention also includes polyalkylene oxides of the type which may be obtained in known manner by the addition of alkylene oxides with starter molecules containing amine nitrogen and at least one, but preferably at least two, active hydrogen atoms capable of addition with alkylene oxides. Polyethers such as these include, for example, the alkoxylation products, preferably propoxylation products, of ammonia, ethylamine, triethanolamine or ethylene diamine which may be converted into dispersions or solutions according to the invention after at least partial neutralization of the tertiary nitrogen atoms with the acids essential to the invention.

The polycondensates which may be converted into dispersions or solutions according to the invention by the process according to the invention include, in particular, polyester resins the production of which is described for example in Houben-Weyl, 14/2, pages 30 et seq, incorporated herein by reference. The only requirement is once again the presence of tertiary nitrogen atoms which can be neutralized with the acids essential to the invention and which are incorporated into the polyesters produced by known methods by using starting materials containing tertiary nitrogen preferably alkanolamines containing tertiary nitrogen, such as for example, N-methyl diethanolamine or triethanolamine. It is preferred not to use free acids in the production of the polyesters in order to prevent salt formation with the starting materials containing tertiary nitrogen. Instead, it is preferred to use low esters of the polycarboxylic acids required for the production of the polyesters, such as for example adipic acid dimethyl ester, maleic acid dimethyl ester, phthalic acid dimethyl ester or esters of other lower alcohols.

Polycarbonates or polyamides produced by any of the known processes are also polycondensates which, providing they contain tertiary amine nitrogen atoms in chemically incorporated form, may be converted into dispersions or solutions according to the invention under the principle according to the invention.

The polymers which may be converted into aqueous dispersions or solutions according to the invention by the process according to the invention also include in particular poly(meth) acrylates of which the production is described for example in Houben-Weyl, Vol. XIV/1, pages 1033 et seq, incorporated herein by reference. The tertiary nitrogen atoms are introduced into the polymers to be produced by known processes in accordance with the principle disclosed in Houben-Weyl, XIV/2, page 754, incorporated herein by reference, i.e. using olefinically unsaturated comonomers containing tertiary amine nitrogen, such as for example, N,N-dimethyl-2-aminoethyl acrylate. Any of the olefinically unsaturated monomers commonly encountered in polyacrylate chemistry, such as for example styrene, acrylonitrile, ethylene, propylene or butadiene, may of course also be used as further starting components.

According to the invention, therefore, any oligomeric or polymeric plastics may be converted into aqueous dispersions or solutions according to the invention. To this end, the only requirement is that the plastics should contain preferably aliphatically-substituted tertiary amine nitrogen atoms which can be neutralized with the acids essential to the invention and which in turn are introduced into the plastic preferably using synthesis components containing tertiary amine nitrogen. Depending upon the chemical nature of the plastics, these synthesis components contain, in addition to the tertiary amine nitrogen atoms, reactive centers, i.e. active hydrogen atoms in the form of primary or secondary amino groups or in the form of hydroxyl groups or polymerizable double bonds.

In the production of polyurethane-polyurea dispersions according to the invention, it is also possible to use synthesis components containing tertiary amine nitrogen which only form isocyanate-reactive groups under the influence of the water used as dispersion medium. This group of compounds includes, for example, aldimine, ketimines or enamines containing tertiary amine nitrogen which are split under the influence of water into tertiary amines containing free primary and/or secondary amino groups. Where synthesis components such as these are used for carrying out the process according to the invention, it is advisable to mix an NCO-prepolymer produced in known manner and peferably containing two terminal isocyanate groups, with a suitable quantity of a synthesis component of the type in question and subsequently to introduce the resulting mixture into water. The acid essential to the invention is preferably dissolved in the water, although it may be added to the aqueous phase after the above-mentioned mixture has been intensively mixed with the water in order, thus, to obtain a dispersion or solution according to the invention.

Accordingly, the starting compounds containing tertiary nitrogen include:

1. N-alkyl-N,N-bis-(aminoalkyl)-amines such as, for example, N-methyl-N,N-bis-(2-aminoethyl)-amine; N-methyl-N,N-bis-(2-aminopropyl)-amine; N,N-bis-(2-aminopropyl)-cyclohexyl-amine; N,N',N''-trimethyl diethylene triamine and their reaction products with aldehydes and/or ketones, optionally with elimination of water, to form aldimines, ketimines or enamines of the type described for example in Houben-Weyl, Methoden der Organischen Chemie, Vol. XI/2, pages 73 et seq, incorporated herein by reference.

2. Hydroxyl compounds containing tertiary nitrogen atoms and having high or low molecular weights, i.e. molecular weights of from about 89 to 10,000 and preferably from about 89 to 300, such as for example, alkoxylated aliphatic, cycloaliphatic, aromatic or heterocyclic primary and/or secondary amines, such as for example, N,N-dimethylaminoethanol; N,N-dimethylamino-2-propanol; N-methyl-N-$\beta$-hydroxylethyl aniline, N-ethoxyl morpholine; N-methyl diethanolamine; N-butyl diethanolamine; N-cyclohexyl diisopropanolamine; polyalkoxylated N-methyl diethanolamine; triethanolamine; and the alkoxylation products of alkylamines, dialkylamines or ammonia.

3. Addition polymerizable compounds containing basic nitrogen atoms such as, for example, N,N-dimethylaminoethanol methacrylate.

It is, in principle, also possible to incorporate primary and secondary amines in such a way that they can subsequently be used for salt formation. In this case, amide formation occurs in addition to salt formation. Accordingly, this embodiment is less preferred.

As already mentioned, it is preferred, for carrying out the process according to the invention, initially to synthesize a polymer containing tertiary nitrogen and subsequently to convert the polymer thus formed into an ionic polymer by at least partial neutralization with an acid essential to the invention, this neutralization step generally being carried out before or during formation of the dispersion or solution. In more exceptional cases, for example where synthesis components containing tertiary nitrogen atoms which only form the reactive groups required for their incorporation into the polymer under the influence of water are used, neutralization may even be carried out after the dispersion step. However, since in general no ionic centers required for the dispersibility or solubility of the polymers are present before neutralization of the tertiary amine groups, it is necessary in this case to carry out the dispersion or dissolution step preceding neutralization in the presence of auxiliary solvents, such as acetone for example, or in mixing units under whose mixing effect the polymer which, basically, is not yet dispersible is kept in disperse form. As already mentioned, it is in principle also possible to neutralize the tertiary amino groups before or even during synthesis of the macromolecule, i.e. to use synthesis components containing ammonium groups obtained by neutralizing tertiary amine nitrogen atoms with acids essential to the invention in the actual synthesis of the polymers.

The molecular weight of the polymers present in the dispersions or solutions according to the invention is determined in known manner by suitably selecting the starting materials and their quantitative ratios.

The polymers may be converted into an aqueous dispersion or solution in known manner with, or even without, the assistance of an auxiliary solvent. Suitable auxiliary solvents are preferably water-miscible solvents which boil at temperatures below about 100° C. under normal pressure and which are inert under the conditions of the process according to the invention. Typical examples of solvents such as these are acetone, methylethyl ketone or tert.-butanol.

It is in principle also possible to incorporate further hydrophilic centers into the polymers. These further hydrophilic centers include in particular ethylene oxide units incorporated within polyether segments or cationic centers which do not correspond to the principle according to the invention of losing their ionic character at temperatures in the range from about 20° to 200° C. The incorporation of hydrophilic centers such as these is disclosed for example in the literature references cited above in the acknowledgement of the prior art. For example, cationic centers may be incorporated in accordance with U.S. Pat. No. 3,479,310, incorporated herein by reference, while non-ionic hydrophilic centers may be incorporated in accordance with U.S. Pat. Nos. 3,920,598 and 3,905,929, both incorporated herein by reference, or German Offenlegungsschrift No. 2,555,534. Hydrophilic centers such as these should not of course be used in a quantity which in itself is sufficient to guarantee the dispersibility or solubility of the polymers, because this would go against the principle according to the invention of producing hydrophobic plastics by heat treating the dispersed or dissolved polymers. In general, therefore, the polymers present in the dispersions or solutions according to the invention should contain ethylene oxide segments arranged within polyether chains in a quantity of at most about 5% by weight and thermally non-decomposable cationic centers in a quantity of at most about 7 milliequivalents per 100 g of solids. It is preferred not to incorporate any heat-resistant hydrophilic centers of the type in question.

The acids essential to the invention are organic acids which are capable of forming ammonium salts with the tertiary amino groups and which, on storage or heating of the polymers present in the aqueous dispersions or solutions according to the invention, lose their acid character after removal of the water at temperatures in the range from about 20° to 200° C., preferably at temperatures in the range from about 50° to 150° C. and, more particularly, at temperatures in the range from 50° to 120° C., without releasing corrosive substances, the tertiary amino groups being reformed from the ammonium groups. The acids in question are preferably (A) organic carboxylic acids which lose their acid character in the absence of water under the above-mentioned temperature conditions with elimination of carbon dioxide, or (B) organic acids, particularly carboxylic or sulphonic acids, which lose their acid character in the absence of water under the above-mentioned temperature conditions with intramolecular ring formation.

The compounds of group A include compounds corresponding to the following formulae:

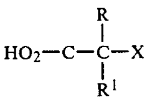

1.

$HO_2C-CH_2-S(=O)-CH_2-CO_2R^2$ 2.

$^2RO_2C-CO_2H$ 3.

while acids of group B include compounds corresponding to the formulae:

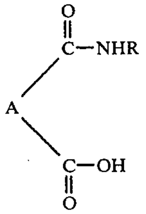

1.

-continued

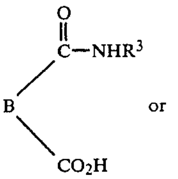

2.

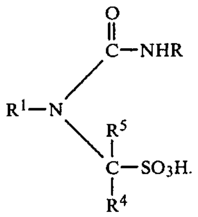

3.

In these formulae:

$R$, $R^1$, $R^4$ and $R^5$, which may be the same or different, represent hydrogen, a $C_1$–$C_4$-alkyl radical which may contain halogen or hydroxyl substituents or a $C_6$–$C_{10}$-aryl radical which may contain these same substituents, $R^2$ represents a $C_1$–$C_4$-alkyl radical, $R^3$ represents a $C_1$–$C_4$-alkyl radical which may contain halogen or hydroxyl substituents or a phenyl radical which may contain these same substituents, X represents —$NO_2$, —CN or —Co—$R^6$ $R^6$ represents $R^3$, —N(R)$R^1$, —$CH_2$—$CO_2H$ or —$OR^3$, A represents a $C_2$ or $C_3$ bridge which may be hydroxyl substituted and which represents an alkylene radical or may be part of a $C_6$–$C_{10}$-aromatic ring system which may contain hydroxyl substituents or part of a cycloaliphatic ring system containing 5 to 12 carbon atoms which may be olefinically unsaturated or represents —$CH_2$—Z—$CH_2$— where Z may be oxygen or sulphur, B represents —D—Y— where D represents a $C_1$–$C_4$ bridge which may be hydroxyl substituted and which may represent an alkylene radical or may be part of an aromatic $C_6$–$C_{10}$ ring system which may be hydroxyl substituted or part of a cycloaliphatic ring system containing from 5 to 12 carbon atoms which may be olefinically unsaturated and Y represents —NR—, —O— or —S—.

The individual radicals in the above formulae preferably have the following meanings:

$R$, $R^1$, $R^4$ and $R^5$: hydrogen or methyl;

$R^2$: a $C_1$–$C_4$-alkyl radical;

$R^3$: a $C_1$–$C_4$-alkyl radical or a phenyl radical;

X: —CN, benzoyl or ethoxy carbonyl;

A: a dimethylene or trimethylene radical;

B: —D—Y—,

D: —$CH_2$— or —$CH_2$—$CH_2$— and

Y: —NH— or —O—.

In addition, in formula B(2), the bridge B is always arranged in such a way that Y is attached to the amide group.

Typical representatives of the acids A(1) are, for example, nitroacetic acid, cyanoacetic acid, acetone dicarboxylic acid, acetoacetic acid, malonic acid methyl semiester, malonic acid hydroxy ethyl semiamide, 2-(ethoxycarbonyl)-acetic acid or benzoyl acetic acid. Typical representatives of the acids A(2) are, for example, the methyl or ethyl semiesters corresponding to the above formula.

Typical representatives of the acids A(3) are, for example, the methyl and ethyl esters of oxalic acid.

Of the acids of group (A), cyanoacetic acid, benzoyl acetic acid and 2-(ethoxycarbonyl)-acetic acid are particularly preferred.

Typical acids of group B(1) are acids corresponding to the formulae:

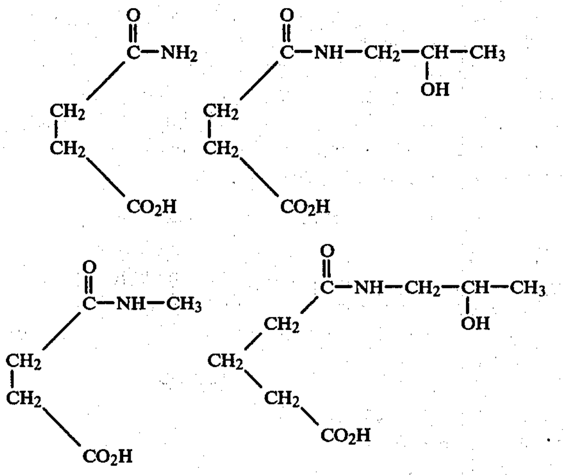

Typical acids of group B(2) are acids corresponding to the formulae:

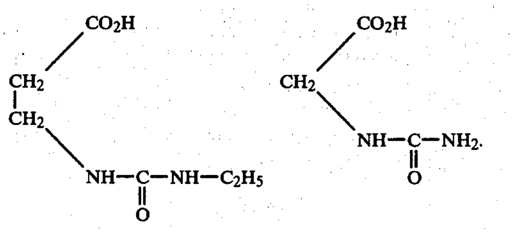

Typical acids of group B(3) are acids corresponding to the formulae:

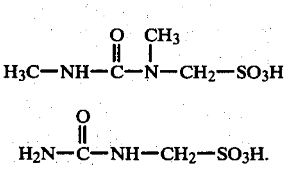

Of the acids of group B, the condensation product of N,N-dimethyl urea and hydroxy methane sulphonic acid, to which reference has just been made, is particularly preferred.

For neutralizing the polymers containing tertiary amine nitrogen with the acids essential to the invention, the reactants are combined in organic phase before the dispersion step, optionally using one of the auxiliary solvents mentioned by way of example above or, preferably, by mixing the polymer containing tertiary amine nitrogen with an aqueous solution of the acid essential to the invention, accompanied by dispersion or dissolution of the polymer. In this case, too, it is possible to use an auxiliary solvent of the type mentioned by way of example above.

The question of whether the compositions according to the invention are dispersions or solutions is primarily dependent upon the molecular weight, and in particular, upon the content of hydrophilic groups. The content of ammonium groups according to the invention in the solid should amount to between about 2 and 200 milliequivalents per 100 g of solids, preferably to between about 8 and 50 milliequivalents per 100 g of solids and, with particular preference, to between about 8 and 30 milliequivalents per 100 g of solids. In the case of aqueous solutions, the particular preferred range extends to about 50 milliequivalents per 100 g of solids. Where only very small quantities of ammonium groups according to the invention are present (less than about 8 milliequivalents per 100 g), it is advisable simultaneously to incorporate the above-mentioned hydrophilic centers which are not essential to the invention or to use external emulsifiers.

The dispersions or solutions always have solids contents of less than about 60% by weight and preferably between about 15 and 50% by weight.

The aqueous dispersions or solutions may be modified in several different ways or subsequently crosslinked. Thus, relatively hard, urea-coated polymers are obtained for example by adding isocyanates, preferably diisocyanates, to the aqueous dispersion in accordance with the teaching of German Patent Application No. P 27 08 442 which corresponds to copending U.S. patent application Ser. No. 875,958, filed Feb. 8, 1978. Isocyanate prepolymers, formaldehyde, formaldehyde donors or melamine resins, for example, are frequently used for crosslinking the polymers. Since the pH-value of the dispersion produced in accordance with the invention is generally below pH 7, crosslinking with formaldehyde is promoted. This is of particular advantage in cases where the dispersion is applied to substrates which can only withstand limited thermal stressing, such as leather for example.

It is of course also possible to add external emulsifiers to the oligomer or polymer before, during or after the dispersion step. However, external emulsifiers will in general only be added where they afford advantages in terms of subsequent processing. Suitable emulsifiers are, for example, ethoxylated alkyl phenols having an average molecular weight of from about 400 to 10,000.

The aqueous dispersions may also contain small quantities (up to about 6% by weight, based on dispersion) of organic solvents of the type mentioned by way of example above. Such additions of solvent can have a positive effect for example on the levelling of a dispersion on the substrate.

A variety of different additives such as, for example, pigments, thickeners, levelling agents, feel-imparting agents, fillers, plasticizers, etc., may also be added to the aqueous dispersions. These additives are determined by the field of application of the dispersion.

Mixtures of different polymer dispersions, for example, polyurethanes of different composition, with one another or with acrylates and the like or polyacrylates with polyesters are also of particular interest. In principle, any mixing variations are practicable, the individual dispersions not having to satisfy all of the criteria according to the invention.

The dispersions or solutions according to the invention are particularly suitable for the production of hydrophobic, i.e. water-resistant, coatings and bonds because the groups responsible for hydrophilicity are largely deprived of their hydrophilic properties by a simple heat treatment. Where the dispersions or solutions according to the invention are used the coatings or adhesive layers present after application of the dispersion or solution are stored or heated at temperatures in the range from about 20° to 200° C., preferably in the range from about 50° to 150° C. and, more particularly, in the range from about 50° to 120° C., with evaporation of the water present, removal of the water generally being followed by storage or after-heating at temperatures within the above-mentioned ranges. In many cases, storage or after-heating at temperatures in the range from about 20° to 70° C. and, more particularly, at temperatures in the range from about 50° to 70° C. is sufficient to obtain a completely hydrophobic polymer. This is surprising insofar as the dispersed or dissolved polymers are extremely heat-resistant in the presence of the water serving as continuous phase and even withstand heating for several hours at 90° to 100° C.

Because of these interesting properties, the range of application of these polymeric dispersions is particularly wide and includes for example the coating of a variety of different materials such as, for example, textiles, leather, rubber, plastics such as, for example, PVC, glass, metals, paper or wood, for which purpose they are used inter alia as lacquers or even as adhesives. The polymeric dispersions may also be used for example for sizing glass fibers or as dispersion aids or as binders, for example for cork or wood powder, glass fibers, asbestos, paper-like materials, plastics or rubber waste and ceramic materials. They may of course also be used as coupling agents for glass or plastics. They may also be used not only in compact form, but also in foamed form.

The quantities quoted in the following Examples are quantities by weight. The wet rubbing of films cast onto glass plates was used as a comparison test. The wet rubbings were carried out with a wet felt on a Satra machine under a load of 2.5 kg and at approximately 150 rpm. The Satra machine is commercially available as the Satra Finish Rub Fastness Tester STM 102. The test is carried out in accordance with Satra's "Physical test method", PM.8, Appendix W.

EXAMPLES

Example 1

Ingredients:

| | | |
|---|---|---|
| 400.0 g | of hexane diol neopentyl glycol adipate (hydroxyl number 66) (PE) | |
| 67.1 g | of hexamethylene diisocyanate (H) | |
| 21.0 g | of N-methyl-bis-(3-aminopropyl)-amine | "amine mixture" |
| 1.0 g | of hydrazine hydrate | "amine mixture" |
| 24.5 g | of semiamide of 1 mole of succinic acid and 1 mole of 2-hydroxy-1-propylamine | |
| 900 g | of desalted water | |
| 1300 g | of acetone | |

Procedure:

The polyester (PE) was dehydrated with stirring for 30 minutes at 110° C. in a water jet vacuum and cooled to 80° C. The diisocyanate (H) was added, followed by stirring at 80° to 90° C. until an isocyanate value of 2.95% was observed (approximately 3 hours). After cooling to 50° C., the acetone was added. When the solution was homogeneous, the amine mixture was added, followed by stirring at 50° C. until no more isocyanate was observed (approximately 90 minutes). The amide was then added slowly, together with all of the dispersion water. The acetone was immediately distilled off, leaving a finely divided dispersion which showed a Tyndall effect in transmitted light. The dispersion had a viscosity of 23.1 seconds (4 mm orifice Ford cup) for a solids content of 29%. Its pH-value amounted to 7. The dispersed solids contained 27.3 milliequivalents of quaternary nitrogen atoms per 100 g of solids. The film cast onto a glass plate and heated at 120° C. withstood 200 wet rubs in the above-mentioned machine.

Comparison Example 1

As Example 1, except that 16.1 g of 85% phosphoric acid were used instead of 24.5 g of the amide.

A finely divided, centrifuging-stable (15 minutes at 3600 rpm) dispersion having a solids content of 22.4% and a pH-value of 6.9 was obtained. The film cast onto a glass plate and heated to 120° C. withstood 22 wet rubs in the machine described above.

Example 2

Ingredients:

400.0 g of propylene glycol-started polypropylene oxide polyether (hydroxyl number 56)
62.6 g of tolylene diisocyanate (65% of 2,4- and 35% of 2,6-isomer)
23.2 g of methyl-bis-(3-aminopropyl)-amine
12.6 g of cyanoacetic acid in
830.0 g of desalted water
600.0 g of acetone Procedure: cf. Example 1

A finely divided dispersion showing a Tyndall effect in transmitted light was obtained. It had a solids content of 37.6% and a pH-value of 6.

The films produced from this dispersion at 130° C. withstood approximately 100 wet rubs in the machine described above. A comparison product produced from a dispersion containing an equivalent quantity of o-phosphoric acid instead of cyanoacetic acid withstood only 25 wet rubs under identical conditions.

Example 3

Ingredients:

342.0 g of polypropylene glycol ether based on bisphenol A (hydroxyl number 197)
47.6 g of N-methyl diethanolamine
210.0 g of hexamethylene diisocyanate
43.5 g butanone oxime Procedure:

The polyester was dehydrated in vacuo with stirring for 30 minutes at 110° C. The amine was added at 80° C. After intensive mixing the diisocyanate was added at 80° C., followed by stirring at 80° C. until an isocyanate content of 3.5% was reached (approximately 30 minutes). The butanone oxime was then added, followed by stirring until the melt contained no more isocyanate.

The hot melt was cast onto a plate and, after cooling, was mechanically size-reduced. The solid had a melting range of 50° to 60° C.

(3*a*) 30 g of the solid were introduced into 70 g of water at room temperature using a magnetic stirrer. The water contained 1.56 g of 85% phosphoric acid. A centrifuging-stable dispersion having a viscosity of 22 seconds (4 mm orifice Ford cup) at a pH-value of 2 was obtained. The film cast onto a glass plate was heated at 140° C. and withstood 25 wet rubs in the Satra machine described above.

(3*b*) 30 g of the solid were introduced into 70 g of water at room temperature using a magnetic stirrer. The water contained 1.15 g of cyanoacetic acid. A finely divided viscous dispersion having a pH-value of 3 was obtained. The film cast onto a glass plate was heated at 140° C. and withstood 60 wet rubs in the Satra machine described above.

Example 4

Ingredients:

700 g of propylene glycol-started polypropylene oxide polyether (hydroxyl number 56)
212 g of phthalic acid/adipic acid/ethylene glycol polyester (hydroxyl number 64)
722 g of phthalic acid/ethylene glycol polyester (hydroxyl number 56)
235 g of hexamethylene diisocyanate
153 g of tolylene diisocyanate (65% of 2,4- and 35% of 2,6-isomer)
134 g of N-methyl diethanolamine
8.1 g of hydrazine hydrate
26.3 g of isophorone diamine
950 g of acetone Procedure:

The three polyesters and polyethers were mixed and dehydrated in vacuo with stirring for 30 minutes at 110° C. The two isocyanates were added at 90° C. The melt was then stirred at 90° C. until an isocyanate content of 6.2% was observed (approximately 1 hour). 395 g of acetone were then added, followed by stirring until a homogeneous solution was obtained. N-methyl diethanolamine was then added, followed by stirring to an isocyanate content of 1.04. Thereafter 555 g of acetone were added and hydrazine hydrate and isophorone diamine were stirred in. When the solution was free of isocyanate, it was divided up and further processed for the following tests (the solution had a solids content of 71.5%):

Example 5

Ingredients:

500 g of desalted water
15.7 g of the reaction product of methyacrylic acid and N,N-dimethyl aminoethanol
13.6 g of cyanoacetic acid
156.2 g of methacrylic acid methyl ester Starters:

0.3 g of ammonium peroxodisulphate
0.17 g of sodium pyrosulphite
5.0 g of water

Procedure:

(a) All of the components were combined at room temperature and heated over a period of 3.5 hours to a temperature of 60° C., followed by stirring for 2 hours at that temperature. The dispersion obtained had a solids content of 27% and a Ford cup viscosity (4 mm orifice) of 23 seconds. The pH-value amounted to 3. The film cast onto a glass plate was heated for 30 minutes at 110° C. After cooling, it withstood 210 wet rubs in the Satra machine described above.

(b) A dispersion prepared in the same way, but with 14 g (85%) of phosphoric acid instead of cyanoacetic acid, had a Ford cup viscosity (4 mm orifice) of 14 seconds for a solids content of 27% and also a pH-value of 3. However, after drying at 110° C., the film cast onto a glass plate withstood only 110 wet rubs in the machine described above.

Example 6

Ingredients:

| | |
|---|---|
| 77.6 g of terephthalic acid dimethyl ester<br>28.8 g of maleic acid dimethyl ester<br>36.8 g of hexahydrophthalic acid dimethyl ester | A |

| No. | Acid/quaternizing agent: Formula | g | g of prep. solution | g of water | Dispersion: % solids | DIN* seconds | pH | m-equ.cat.** | rubs*** |
|---|---|---|---|---|---|---|---|---|---|
| 1. | dimethyl sulphate (comparison) | 4.5 | 100 | 305 | 22.8 | 25 | 5 | 50 | 30 |
| 2. | phosphoric acid (85%) (comparison) | 4.12 | 100 | 265 | 24.3 | 27.2 | 5 | 50 | 90 |
| 3. | cyanoacetic acid | 3.05 | 100 | 265 | 25.3 | >60 | 6 | 50 | 300 |
| 4. | nitroacetic acid | 3.75 | 100 | 180 | 33.1 | 18.9 | 5 | 50 | 263 |
| 5. | $H_3C—NH—CO—N(CH_3)—CH_2—SO_3H$ 46% $H_2O$ | 14.06 | 100 | 210 | 30.5 | — | 6 | 50 | >600 |
| 6. | $H_2N—CO—NH—CH_2—SO_3H$ 22% solution in water (acid number 43,6) | 46.0 | 100 | 175 | 29.3 | — | 6 | 50 | 315 |
| 7. | $H_3C—CH(OH)—CH_2—NH—CO—(CH_2)_2—CO_2H$ | 6.25 | 100 | 180 | 33.8 | — | 5 | 50 | 194 |
| 8. | $H_3C—CH(OH)—CH_2—NH—CO—(CH_2)_3—CO_2H$ | 6.75 | 100 | 280 | 23.5 | 25.6 | 6 | 50 | 187 |
| 9. | $H_5C_2—O_2C—CH_2—COOH$ (SZ418) | 4.80 | 100 | 300 | 21.9 | 22.5 | 5 | 50 | 203 |
| 10. | $H_5C_2—O_2C—COOH$ (AZ 407) | 4.92 | 100 | 300 | 23.8 | — | 5 | 50 | 192 |
| 11. | 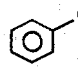 CO—$CH_2$—COOH (SZ 297) | 6.75 | 100 | 570 | 13.0 | 25.8 | 7 | 50 | 300 |
| 12. | $C_2H_5—NHCO—NH—(CH_2)_2CO_2H$ | 7.24 | 100 | 265 | 25.6 | — | 7 | 50 | 160 |
| 13. | $H_3C—O_2C—CH_2—S—CH_2—CO_2H$ (comparison) | 5.86 | 100 | 380 | 18.2 | 17 | 5 | 50 | 65 |
| 13a. | $H_3C—O_2C—CH_2—SO—CH_2—CO_2H$ | 6.44 | 100 | 380 | 18.3 | 22 | 5 | 50 | 150 |
| 14. | acetone dicarboxylic acid | 5.22 | 100 | 200 | 29.7 | 23.3 | 7 | 50 | 580 |
| 15. | $H_2N—CO—NH—CH_2—CO_2H$ | 4.22 | 100 | 345 | 19.9 | — | 6 | 50 | 172 |

*Ford cup viscosity (4mm orifice DIN 53211).
**m-equivalents of cations per 100 g of solids.
***number of wet rubs withstood by the films heated at 110° C. in the Satra machine.

-continued

| | | |
|---|---|---|
| 29.8 g | of triethylamine | A |
| 34.1 g | of ethylene glycol | A |
| 13.8 g | of $H_3PO_4$ (85% in water) | A |
| 595 g | of desalted water | |

Procedure:

The starting components A were heated under nitrogen at 140° C. until no more methanol distilled off. The melt was then stirred in vacuo (10 Torr) at 140° C. until a hydroxyl number of 103 was observed. Thereafter, the phosphoric acid was stirred into the melt cooled to 80° C. After 5 minutes, the melt was dispersed with water heated to 50° C. A finely divided dispersion was obtained, having a Ford cup viscosity (4 mm orifice) of 10 seconds for a solids content of 20% by weight. Its pH-value amounted to 4. The film dried at 120° C. on a glass plate withstood 5 wet rubs under a load of 355 g in the machine described above.

A dispersion prepared in the same way, but with an equimolecular quantity of cyanoacetic acid instead of the phosphoric acid, had a Ford cup viscosity (4 mm orifice) of 13 seconds for a solids content of 20%. The film dried at 120° C. on a glass plate withstood 138 wet rubs under a load of 355 g in the Satra machine described above.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Aqueous dispersions of oligomers or polymers, polycondensates or polyaddition products containing from about 2 to 200 milliequivalents per 100 g of solids of incorporated ammonium groups obtained by the neutralization of incorporated tertiary nitrogen atoms with organic acids, characterized in that the organic acid with the exception of carbonic acid on which the ammonium groups are based is an acid which loses its acid character at temperatures in the range from about 20° to 200° C. in the absence of water without releasing corrosive decomposition products.

2. Aqueous dispersions as claimed in claim 1, characterized in that the organic acids used lose their acid character at temperatures in the range from about 20° to 200° C. in the absence of water with elimination of carbon dioxide or with intramolecular ring formation.

3. Aqueous dispersions of oligomers or polymers, polycondensates or polyaddition products containing from about 2 to 200 milliequivalents per 100 g of solids of incorporated ammonium groups obtained by the neutralization of incorporated tertiary nitrogen atoms with organic acids, characterized in that the organic acid on which the ammonium groups are based is an acid which loses its acid character at temperatures in the range from about 20° to 200° C. in the absence of water without releasing corrosive decomposition products and corresponds to the formulae:

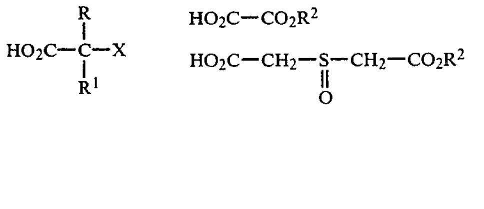

-continued

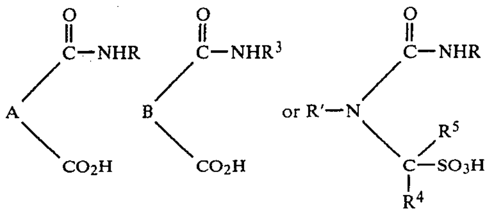

in which:

R, $R^1$, $R^4$ and $R^5$, which may be the same or different represent hydrogen, a $C_1$–$C_4$-alkyl radical which may contain halogen or hydroxyl substituents or a $C_6$–$C_{10}$-aryl radical which may contain these same substituents, $R^2$ represents a $C_1$–$C_4$-alkyl radical, $R^3$ represents a $C_1$–$C_4$-alkyl radical which may contain halogen or hydroxyl substituents or a phenyl radical which may contain these same substituents, X represents $-NO_2$, —CN or —CO—$R^6$, $R^6$ represents $R^3$, —N(R)$R^1$, $-CH_2-CO_2H$ or —$OR^3$, A represents a $C_2$ or $C_3$ bridge, which may be hydroxyl-substituted, and which may represent an alkylene radical or may be part of a $C_6$–$C_{10}$-aromatic ring system which may contain hydroxyl substituents or part of a cycloaliphatic ring system containing from 5 to 12 carbon atoms which may be olefinically unsaturated or represents $-CH_2-Z-CH_2-$ where Z may represent oxygenor sulphur, B represents —D—Y— where D represents a $C_1$–$C_4$ bridge, which may be hydroxyl-substituted and which may represent an alkylene radical or may be part of an aromatic ring system which may contain hydroxyl substituents or part of a cycloaliphatic ring systemcontaining from 5 to 12 carbon atoms which may be olefinically unsaturated, and Y represents —NR—, —O— or —S—.

4. Aqueous dispersions as claimed in claim 1, characterized in that they are aqueous dispersions of oligourethanes or polyurethanes having a predominantly linear molecular structure.

5. A process for producing the aqueous dispersions claimed in claim 1 by the synthesis of oligomeric or polymeric plastics in known manner by the polymerization, polycondensation or polyaddition of low molecular weight synthesis components using synthesis components containing tertiary amine nitrogen and/or ammonium groups obtained by neutralizing incorporated tertiary amino groups with organic acids, at least partially neutralizing the tertiary amino groups present, if any, with an organic acid, the type and quantity of the synthesis components containing tertiary amino groups and/or ammonium groups and their degree of neutralization being selected in such a way that the oligomers or polymers formed contain from about 2 to 200 milliequivalents of ammonium groups per 100 g of solids, and converting the oligomers or polymers in known manner into an aqueous dispersion during or after the synthesis reaction leading to the oligomer or polymer, characterized in that organic acids with the exception of carbonic acid which lose their acid character at temperatures in the range from about 20° to 200° C. in the absence of water without releasing corrosive decomposition products are used for neutralizing the tertiary amino groups and/or for producing the synthesis components containing ammonium groups.

6. A process for producing aqueous dispersions as claimed in claim 5, characterized in that the organic acids used correspond to the formulae:

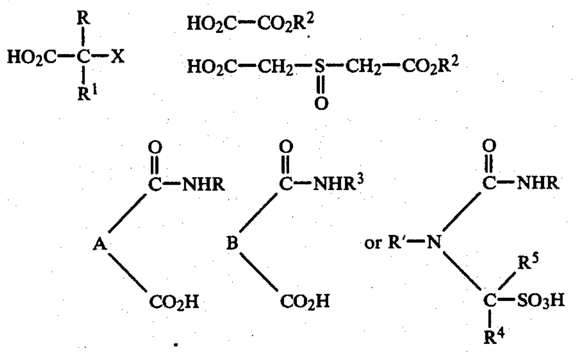

in which:

R, $R^1$, $R^4$ and $R^5$, which may be the same or different, represent hydrogen, a $C_1$–$C_4$-alkyl radical which may contain halogen or hydroxyl substituents or a $C_6$–$C_{10}$-aryl radical which may contain these same substituents, $R^2$ represents a $C_1$–$C_4$-alkyl radical, $R^3$ represents a $C_1$–$C_4$-alkyl radical which may contain halogen or hydroxyl substituents or a phenyl radical which may contain these same substituents, X represents —$NO_2$, —CN or —CO—$R^6$, $R^6$ represents $R^3$, —N(R)$R^1$, —$CH_2$—$CO_2H$ or —$OR^3$, A represents a $C_2$ or $C_3$ bridge, which may be hydroxyl-substituted, and which represents an alkylene radical or may be part of a $C_6$–$C_{10}$-aromatic ring system which may contain hydroxyl substituents or part of a cycloaliphatic ring system containing from 5 to 12 carbon atoms which may be olefinically unsaturated or represents —$CH_2$—Z—$CH_2$— where Z may represent oxygen or sulphur, B represents —D—Y— where D represents a $C_1$–$C_4$ bridge which may be hydroxyl-substituted and which may represent an alkylene radical or which may be part of an aromatic ring system which may contain hydroxyl substituents or part of a cycloaliphatic ring system containing from 5 to 12 carbon atoms which may be olefinically unsaturated and Y represents —NR—, —O— or —S—.

7. A process for the production of aqueous dispersions of oligourethanes or polyurethanes having a predominantly linear molecular structure by reacting organic diisocyanates with synthesis components difunctional in the context of the isocyanate-polyaddition reaction containing isocyanate-reactive groups, optionally together with small quantities of synthesis components monofunctional or higher than difunctional in the context of the isocyanate-polyaddition reaction, using synthesis components containing ammonium groups and/or tertiary amino groups and isocyanate-reactive hydrogen atoms, at least partially neutralizing the tertiary amino groups present, if any, the type and quantity of synthesis components containing tertiary amino groups and/or ammonium groups and their degree of neutralization being selected in such a way that the oligourethanes or polyurethanes formed contain from about 2 to 200 milliequivalents of ammonium groups per 100 g of solids, converting the ionic oligourethanes or polyurethanes thus obtained in known manner into an aqueous dispersion during and/or after the synthesis reaction leading to the oligourethane or polyurethane, characterized in that the amino groups are neutralized with organic acids with the exception of carbonic acid which lose their acid character attemperatures in the range from about 20° to 200° C. in the absence of water with elimination of carbon dioxide or with intramolecular ring formation and/or the synthesis components containing ammonium groups used are obtained by neutralization of synthesis components containing tertiary amino groups with acids of this type.

8. In a process for the production of a water-resistant coating or adhesive on a substrate, the improvement comprising applying the aqueous dispersions of claim 1 to said substrate and storing or heat-treating said treated substrate at temperatures in the range of from about 20° to 200° C. during and/or after removal of the water by evaporation.

9. In a process for producing aqueous dispersions of oligomers or polymeric plastics synthesized by polymerization, polycondensation or polyadditon reactions of low molecular weight synthesis components, the improvement comprising incorporating into said oligomeric or polymeric plastics from about 2 to 200 milliequivalents of ammonium groups per 100 g of solids, said ammonium groups obtained by the neutralization of tertiary amino groups with organic acids with the exception of carbonic acid which lose their acid character at temperatures in the range from about 20° to 200° C. in the absence of water without releasing corrosive decomposition products.

* * * * *